3,130,347
APPARATUS AND SYSTEMS FOR DIMMING AND OPERATING GASEOUS DISCHARGE LAMPS
Theodore R. Harpley, Danville, Ill., assignor to General Electric Company, a corporation of New York
Filed June 4, 1962, Ser. No. 199,734
8 Claims. (Cl. 315—98)

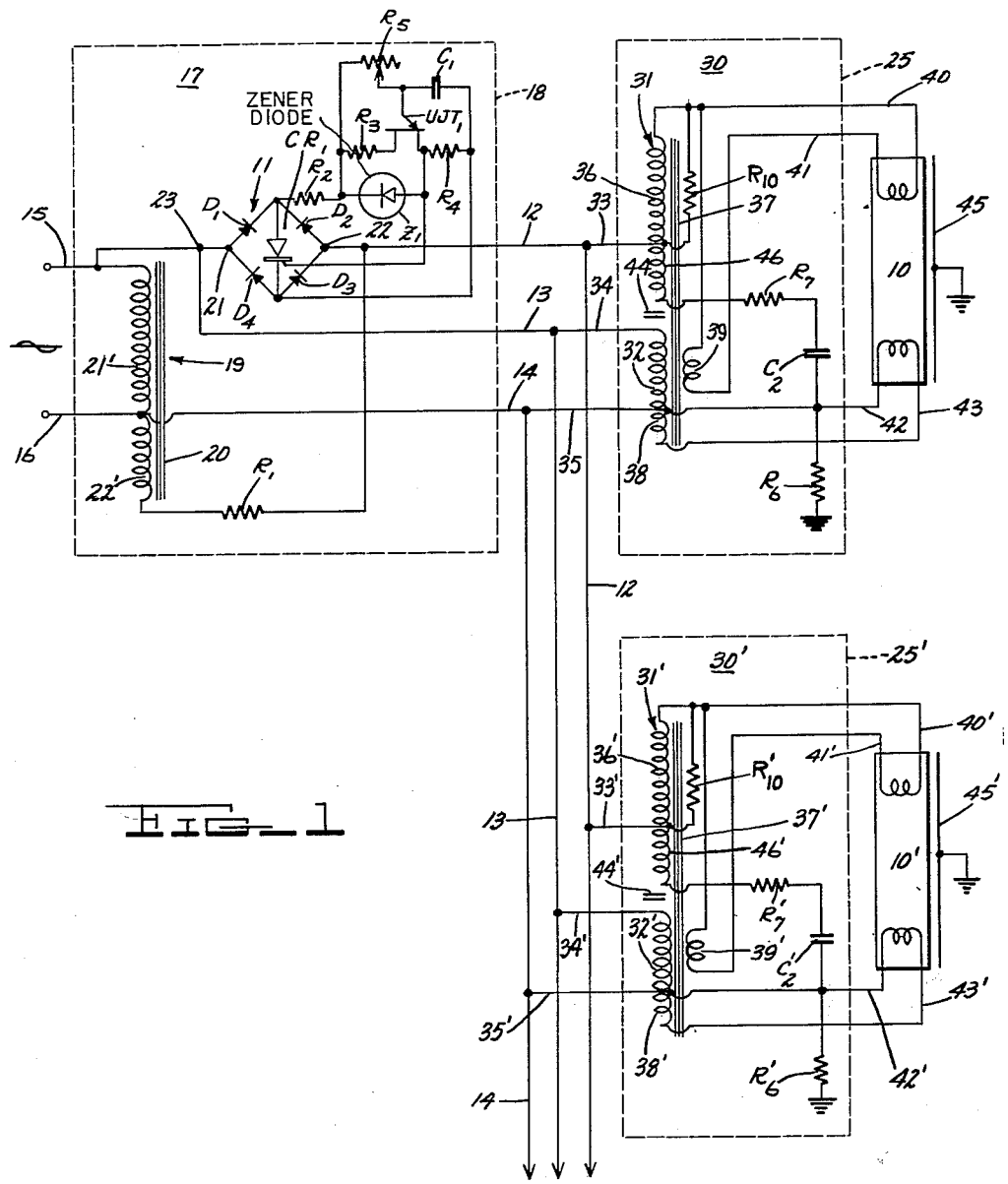

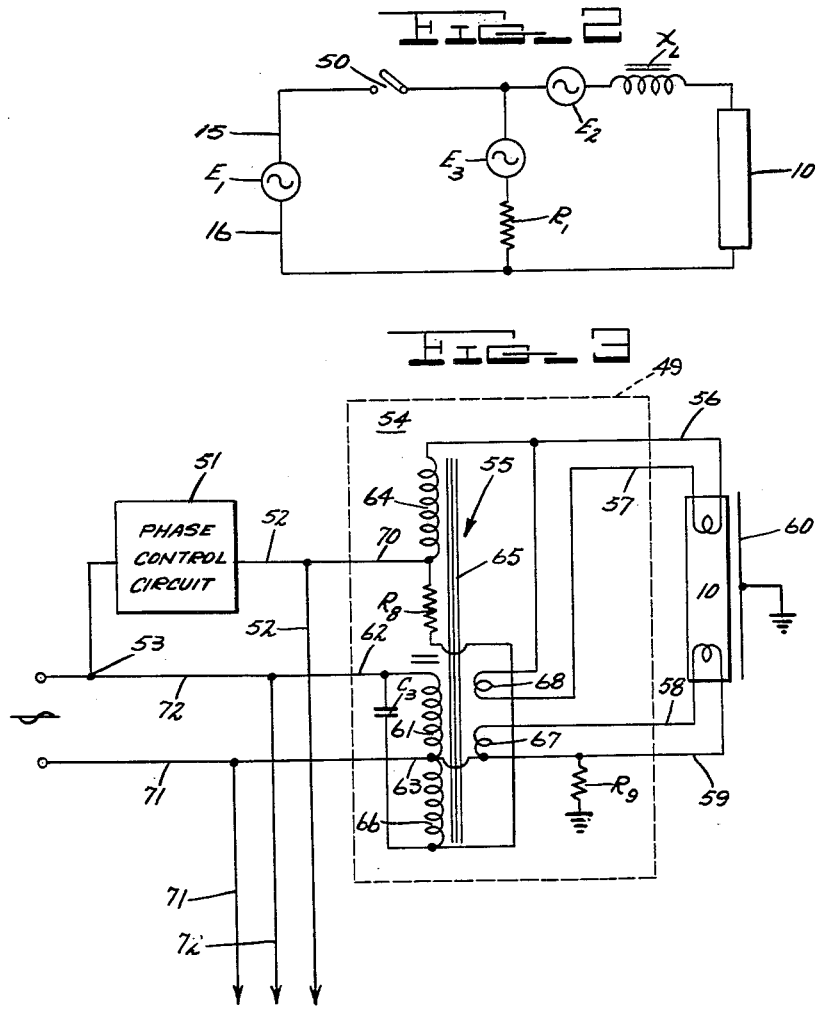

This invention relates to apparatus and systems for dimming and operating gaseous discharge lamps such as fluorescent lamps. More particularly, it relates to such apparatus and systems in which dimming of the gaseous discharge lamps is achieved by controlling the volt-time integral of the voltage applied to the lamp by means of phase control circuits employing controlled rectifiers or other phase controlled switching devices.

Control of the volt-time integral of the voltage applied across a gaseous discharge lamp, such as a fluorescent lamp, is accomplished by firing a controlled rectifier or other phase controlled switching device at a predetermined point in each half cycle of the alternating power supply. Until the controlled rectifier is fired, no energy is supplied to the fluorescent lamp. When the controlled rectifier is fired at a predetermined point in the half cycle, energy is supplied to the fluorescent lamp for the remainder of the half cycle as determined by the volt-time integral of the instantaneous lamp voltage. The controlled rectifier is turned off by the reversal in polarity which occurs at the end of the half cycle.

Since controlled rectifiers, such as silicon controlled rectifiers, can be readily switched into a conduction state at a predetermined point in each half cycle by the application of a small signal at the gate electrode, they have been used in fluorescent lamp dimming systems. Where a silicon controlled rectifier is gated with a pulse of a few microseconds' duration, the controlled rectifier remains in conduction after the pulse is removed from the gate only so long as the current flowing through the controlled rectifier is equal or greater than the holding current value of the controlled rectifier.

The holding current of a controlled rectifier is the instantaneous value of the anode current flowing into the controlled rectifier, below which the controlled rectifier will return to a forward blocking state after having been triggered into forward conduction. For example, the holding current for the silicon controlled rectifiers used in the exemplifications of the invention was about 25 milliamperes.

Where silicon controlled rectifiers are used in a phase control circuit to dim fluorescent lamps by varying the volt-time integral of the lamp voltage, it was found that at low illumination levels the current through the controlled rectifiers falls below the holding current value. As a result, the controlled rectifier is prematurely turned off in the half cycle. To insure that sufficient holding current is provided, a holding current resistor was connected in shunt with the load, which includes the ballast and the lamp. Although the holding current resistor provided a solution to the problem of maintaining the holding current above the minimum value required to keep the controlled rectifier in conduction, it was found that sharp rises in the illumination level occurred at certain points in the dimming range when only a holding current resistor was used. Such sharp rises in the illumination level are, of course, objectionable from a performance standpoint.

Accordingly, it is an object of the present invention to provide an improved apparatus and a system for dimming gaseous discharge lamps.

Another object of the present invention is to provide an improved apparatus for dimming arc discharge lamps such as fluorescent lamps by controlling the volt-time integral of the instantaneous lamp voltage.

It is still another object of the present invention to provide an improved ballast apparatus for use in conjunction with a fluorescent lamp dimming system employing controlled rectifiers or other phase controlled switching devices.

A more specific object of the invention is to provide an improved holding current arrangement for a fluorescent lamp dimming system utilizing controlled rectifiers.

These and other objects and advantages of the invention are achieved in one form thereof in which I have provided an improved holding current arrangement in a system for dimming and operating gaseous discharge lamps from an alternating current source. The improved system includes a plurality of ballast transformers operatively connected with gaseous discharge lamps. Each of the ballast transformers includes a primary winding and a high leakage reactance secondary winding inductively coupled therewith on a magnetic core. A switching terminal lead is connected with one end of the high leakage reactance secondary winding and is connected in circuit with a phase control circuit having at least one controlled rectifier. Control of the volt-time integral of the lamp voltage is achieved by firing the controlled rectifier or other phase controlled switching device at a predetermined point in each half cycle of the alternating power source and connecting the switching terminal lead in circuit with one of the input terminal leads of the primary winding for a controlled interval in each half cycle.

The improved holding current arrangement includes a bucking voltage source connected in series circuit relation with a holding current resistor and in circuit across the switching terminal lead and an input lead of the primary winding of the ballast transformers connected in the system. The voltage of the bucking voltage source is substantially equal in magnitude to the voltages induced across the high leakage reactance secondary windings of the ballast transformers. When the controlled rectifier or other phase controlled switching device of the phase control circuit is in a non-conducting state, the voltage across the bucking voltage source cancels out the voltages induced in the high leakage reactance secondary windings thereby preventing energy from being supplied to the lamps when the device is nonconducting or switched off.

In one aspect of the invention the holding current arrangement is used in conjunction with the phase control circuit and includes a bucking transformer having a primary winding and a closely coupled secondary winding. The secondary winding and a holding current resistor are connected in a branch across a switching line and one of the supply lines to which the ballast transformers are connected. When the phase control circuit is in a non-conducting state, the voltage across the secondary winding of the bucking transformer cancels out all of the voltages across the high leakage reactance secondary windings of the ballast transformers connected in the system thereby insuring that no voltage is applied across the lamps.

According to another aspect of my invention, the holding current arrangement of the invention is incorporated into the ballasts. A secondary winding closely coupled with the primary winding of the ballast transformer serves as the bucking voltage source. In each of the ballasts the voltage induced across the high reactance secondary winding is cancelled out by the voltage induced across the bucking winding when the phase control circuit is in a non-conducting state. When the phase control circuit is in a conducting state, the voltage across the high leakage reactance secondary is applied across the lamp, and the holding current resistor and bucking winding insure that sufficient holding current is provided for the controlled rectifier of the phase controlled circuit.

The subject matter which I regard as my invention is set forth in the appended claims. The invention itself, however, together with further objects and advantages thereof may be understood by referring to the following description taken in connection with the accompanying drawings in which:

FIGURE 1 is a schematic circuit diagram of a fluorescent lamp dimming system in which one form of my invention is embodied;

FIGURE 2 is a simplified equivalent circuit diagram corresponding to the schematic circuit diagram shown in FIGURE 1; and FIGURE 3 is a schematic circuit diagram of another embodiment of the invention in which the holding current arrangement is incorporated in the ballast circuit.

Referring now more particularly to the schematic circuit diagram of the dimming system shown in FIGURE 1, it will be seen that a phase control circuit employing a single controlled rectifier $CR_1$ connected across a full wave rectifier bridge 11 controls the interval of current conduction between a switching line 12 and supply line 13 of a pair of supply lines 13, 14. The pair of supply lines 13, 14 are connected in circuit with input leads 15, 16, which are provided for connection to an alternating power source, such as a 120 volt, 60 cycle supply.

In FIGURE 1, I have enclosed the apparatus 17 in a dashed rectangle 18, which represents the housing means for the apparatus 17. It will be seen that the apparatus 17 includes a bucking transformer 19 and the phase control circuit, which is switched in and out of a conducting state in each half cycle to connect and disconnect the switching line 12 from the supply line 13 for a predetermined interval in each half cycle.

The bucking transformer 19 is comprised of a magnetic core 20, a primary winding 21', and a bucking secondary winding 22' closely coupled with the primary winding 21' on the magnetic core 20. The secondary winding 22' is so arranged that the voltage induced across the winding 22' is substantially equal to and 180 degrees out of phase with the secondary voltage of the ballast transformers connected in circuit with the apparatus 17.

It will be noted that the switching network is comprised of the controlled rectifier $CR_1$ and the bridge 11 formed of diodes $D_1$, $D_2$, $D_3$, $D_4$. The controlled rectifier $CR_1$ and the bridge 11 function as a bidirectional switch. When the controlled rectifier $CR_1$ is fired in an arbitrary positive half cycle and input lead 15 is positive with respect to input lead 16, the current through the switching network takes a path which includes input terminal 21, diode $D_1$, the controlled rectifier $CR_1$, diode $D_3$ and input terminal 22. In a negative half cycle of the alternating power supply, current through switching network follows a path which includes input terminal 22, diode $D_2$, the controlled rectifier $CR_1$, diode $D_4$ and input terminal 21. Accordingly, when controlled rectifier $CR_1$ is switched into a conducting state in each half cycle, switching line 12 is connected in electrical circuit with the junction 23 to which supply line 13 and input lead 15 are joined. Further, it will be noted that when the controlled rectifier $CR_1$ is switched to its nonconducting state in each half cycle, the switching line 12 is in effect disconnected from the junction 23 because of the high impedance of the controlled rectifier $CR_1$. The supply line 13 still remains joined in circuit with the alternating power source connected across input leads 15, 16. Thus, ballast primary windings 32, 32' of ballasts 30, 30' remain continuously energized even though the switching line 12 is disconnected in each half cycle. Further, it will also be noted that holding current branch which includes the serially connected bucking secondary winding 22' and holding current resistor $R_1$ remain connected in circuit across the switching line 12 and supply line 14 as the phase control circuit is alternately switched from a conducting to a nonconducting state during operation of the system.

Although I have illustrated a switching network employing a single controlled rectifier $CR_1$ in the embodiment shown in FIGURE 1, it will be understood that a pair of inversely connected controlled rectifiers or other phase controlled devices may be used to provide the required bidirectional control over the instantaneous current flow between junction 23 and switching line 12. The controlled rectifier $CR_1$ used in the exemplification of the invention was a silicon controlled rectifier having three terminals, an anode represented by the arrow symbol, a cathode represented by the line drawn through the apex of the arrow symbol and a gate represented by the diagonal line extending from the cathode. The silicon controlled rectifier $CR_1$ conducts in a forward direction with a forward characteristic similar to that of an ordinary rectifier when a small gate signal is applied at its gate electrode and will continue to conduct even after the gate signal is removed provided a minimum holding current is supplied to the controlled rectifier $CR_1$.

To fire the controlled rectifier $CR_1$ at a predetermined point in each half cycle a unijunction firing circuit was employed. The firing circuit includes a Zener diode $Z_1$, a unijunction transistor $UJT_1$, a capacitor $C_1$ and the resistors $R_2$, $R_3$, $R_4$ and $R_5$. Resistor $R_2$ in conjunction with the Zener diode $Z_1$ limits the maximum interbase voltage of the unijunction transistor $UJT_1$. The resistor $R_3$ is connected with the base-two electrode of the unijunction transistor $UJT_1$ and compensates for temperature variations in the peak point emitter voltage of the unijunction transistor $UJT_1$. Resistor $R_4$ connected with the base-one electrode of the unijunction transistor $UJT_1$ fixes the pulse amplitude of the voltage applied across the gate and cathode of the controlled rectifier $CR_1$. The variable resistor $R_5$ serves as a dimmer control and sets the magnitude of the charging current supplied to the capacitor $C_1$. Thus, the setting of the variable resistor $R_5$ determines the point in each half cycle when the voltage across the capacitor $C_1$ reaches the peak point emitter voltage of the unijunction transistor $JUT_1$, at which point the unijunction transistor $UJT_1$ is turned on to cause the capacitor $C_1$ to discharge through the resistor $R_4$ and to provide a pulse at the gate of the controlled rectifier $CR_1$. The switching network illustrated in FIGURE 1 is more fully described and claimed in application Serial Number 46,189, filed in the name of Frank W. Gutzwiller on July 29, 1960, now abandoned, and a continuation-in-part application S.N. 188,602, filed April 9, 1962 and assigned to the assignee of the present application.

Referring now more particularly to the ballast circuits illustrated in FIGURE 1, it will be noted that ballasts 30, 30' are shown enclosed in dashed rectangles 25, 25' which represent the ballast cases. The ballasts 30, 30' are connected in circuit with the switching line 12 and supply lines 13, 14. Since the ballasts 30, 30' are identical, I have used the same reference numerals to identify the corresponding components and connections of ballasts 30, 30', the reference numerals used to identify the components and connections of ballast 30' being primed.

The primary windings 32, 32' of the ballast transformers 31, 31' are connected in circuit with the switching line 12 and supply lines 13, 14 by the switching terminal leads 33, 33', input terminal leads 34, 35 and 34', 35', respectively. During operation, it will be appreciated that the primary windings 32, 32' of the ballast transformers are continuously energiezd since the line voltage appears across the supply lines 13, 14. High leakage reactance secondary windings 36, 36' are inductively coupled with the primary windings 32, 32', respectively on magnetic cores 37, 37'. When the controlled rectifier $CR_1$ conducts, it will be noted that the switching terminal leads 33, 33' are connected in circuit with the input terminal leads 34, 34'. Thus, the high reactance secondary windings 36, 36' are connected in autotransformer relationship with the primary windings 32, 32', respectively.

To provide a continuous supply of cathode heating current to lamps 10, 10', each of the ballasts 30, 30' are provided with a pair of cathode heating windings 38, 39 and 38', 39'. The external connections to lamps 10 and 10' are made by a plurality of leads 40, 41, 42, 43 and 40', 41', 42', 43', respectively. Magnetic shunts 44, 44' provide a high reluctance leakage path between the primary windings 32, 32' and high leakage reactance secondary windings 36, 36', respectively. A grounded conductive plate 45, 45' is disposed in capacitive relation with lamp 10, 10', respectively, to aid in the starting of the lamp 10, 10'. A grounded resistor $R_6$, $R_6'$ is included in the ballasts 30, 30' so that the low potential side of the ballast circuit forms a closed loop in the auxiliary starting aid circuit.

It will be noted that each of the ballasts 30, 30' include an oscillatory branch comprised of a second secondary winding 46, 46', a resistor $R_7$, $R_7'$ and a capacitor $C_2$, $C_2'$. The oscillatory branch arrangement is more fully described and claimed in application Serial Number 104,-107, filed in the name of Luther L. Genuit on April 19, 1961 and assigned to the assignee of the present application.

Resistors $R_{10}$, $R_{10}'$ connected across the secondary windings 36, 36', respectively are provided to damp the oscillation produced in secondary windings 46, 46' and capacitors $C_2$, $C_2'$ at the instant the controlled rectifier $CR_1$ is turned on in each half cycle. The resistors $R_{10}$, $R_{10}'$ do not impair the operation of the oscillatory circuit since the initial half cycle of the oscillation is utilized to provide the required peak. Further, the resistors $R_{10}$, $R_{10}'$ contribute to the holding circuit since the next half cycle of the oscillation would produce a current which would substract from the holding current provided by the resistor $R_1$ and the transformer 19. Without the resistors $R_{10}$, $R_{10}'$ it was found that dimming ratios greater than 100:1 were not readily achieved.

To aid in the description of the operation of the system illustrated in FIGURE 1, I have shown in FIGURE 2 a simplified equivalent circuit diagram corresponding to the circuit diagram of FIGURE 1. In the equivalent circuit diagram the power supply connected across input leads 15, 16 is represented by a power source having a voltage $E_1$. The phase control circuit is represented by a switch 50. Only one of the ballasts is represented in the equivalent circuit diagram and it is shown as a power source having a voltage $E_2$, and a leakage reactor $X_L$, connected in series with the lamp 10. The voltage generated across the high leakage reactance secondary winding 36 as shown in FIGURE 1 is represented by the power source having a voltage $E_2$. I have represented the bucking transformer 19 of FIGURE 1 by a third power source having a voltage $E_3$ and connected in series circuit relation with the holding current resistor $R_1$ across the phase control switch 50 and the power supply source providing a voltage $E_1$. The voltage $E_3$ is substantially equal in magnitude to and 180 degrees out of phase with the voltage $E_2$.

It will be apparent from the equivalent circuit diagram shown in FIGURE 2 that when the phase control switch 50 is open in each half cycle or in other words, when the phase control circuit is in a nonconducting state in each half cycle, the lamp 10 is disconnected from the supply voltage $E_1$, and is in a closed loop which includes the voltage source supplying a voltage $E_2$, the leakage reactor $X_L$, the holding current resistor $R_1$ and the bucking voltage source supplying a voltage $E_3$. Since the two voltages $E_2$ and $E_3$ cancel each other out, the lamp 10 is not supplied energy when the phase control switch 50 is closed or when the phase control circuit is in a nonconducting state.

When the phase control switch 50 is closed or, in other words, when the phase control circuit shown in FIGURE 1 is in a conducting state, the bucking voltage $E_3$ adds to the current of the supply voltage $E_1$ and insures that the current through the switch or controlled rectifier $CR_1$ of FIGURE 1 is maintained at a value equal to or above the holding current value of the controlled rectifier $CR_1$. Further, for this condition of the apparatus, it will be noted that the source voltage $E_1$ and the ballast secondary volage $E_2$ are then applied across the lamp 10 during the conduction interval of the controlled rectifier $CR_1$. An important advantage resulting from this arrangement is that it positively insures that secondary voltage will not appear across the lamp when the phase control switch 50 is in the "open" position.

Having more specific reference to FIGURE 1, the operation of the system shown therein will be more fully described. The fluorescent lamp dimming system is energized by connecting the input leads 15, 16 in circuit with an alternating current power source. With the input leads 15, 16 connected to a power source, the primary windings 32, 32' and all the other ballast primary windings connected in circuit with the supply lines 13, 14 are energized. A voltage will be induced across the high leakage reactance secondary windings 36, 36' and across the cathode heating windings 38, 39 and 38', 39'. Under open circuit conditions the oscillatory branches which include the second secondary windings 46, 46' are effective in the lamp circuit and provide oscillatory voltage to aid in starting the lamps 10, 10' at low illumination levels.

When the input leads 15, 16 are energized, the full wave bridge 11 is energized and converts the alternating voltage across input terminals 22, 23 to a clipped full wave rectified voltage that is applied to the unijunction transistor $UJT_1$. At the start of the first instantaneous rectified current wave, the capacitor $C_1$ begins charging. The setting of the dimmer control $R_5$ determines the point in each half cycle at which capacitor $C_1$ is charged to the peak emitter voltage of the unijunction transistor $UJT_1$. Thus, the setting of the dimmer control $R_5$ determines the point at which the unijunction transistor $UJT_1$ is fired in each half cycle.

Until unijunction transistor $UJT_1$ is fired at some point in the half cycle, the controlled rectifier $CR_1$ remains in a blocking or nonconducting state and the switching line 12 is, in effect, disconnected from the supply line 13. During this nonconduction interval of the controlled rectifier $CR_1$, the switching terminal leads 33, 33' are not connected in circuit with input terminal leads 34, 34'. Further, it will be seen that the secondary winding 22 of the bucking transformer 19 and the holding current resistor $R_1$ are connected in circuit across the switching line 12 and the supply line 4 and are included in an operating loop which includes the high reactance secondary windings 36, 36' and the lamps 10, 10'. Consequently, the voltage generated across the secondary winding 22' of the bucking transformer 19 appears in the operating loops of all of the ballast circuits and cancels out the voltage induced in the high reactance secondary winding 36, 36' only when the controlled rectifier $CR_1$ is in a nonconducting state. As a result, the net voltage across each of the lamps 10, 10' operated in the system during the nonconduction interval of the controlled rectifier $CR_1$ is substantially zero.

Assuming that the controlled rectifier $CR_1$ is fired in an arbitrary positive half cycle with the lamps ignited, the instantaneous current follows a path which may be traced from input lead 15 through the input terminal 21, diode $D_1$, controlled rectifier $CR_1$, diode $D_3$, switching line 12, switching terminal lead 33, high reactance secondary winding 36, lead 40, lamp 10, lead 42, input terminal lead 35, supply line 14 and to input lead 16. The current takes a similar path in each of the ballast circuits connected across the supply lines 13, 14 and the switching line 12.

During the negative half cycle when the controlled rectifier $CR_1$ is in a conducting state, the path of the instantaneous current flow is in a reverse direction. Considering again only one of the ballasts 30, the path of current flow may be traced from the input terminal lead 16, supply line 14, input terminal lead 35, lead 42, lamp 10, lead 40, the high leakage reactance secondary winding 36, switching terminal lead 33, switching supply line 12, diode $D_2$, controlled rectifier $CR_1$, diode $D_4$ and to input lead 15.

The illumination level of the fluorescent lamps 10, 10' and other lamps connected in the system is varied by changing the setting of the variable resistor $R_5$. As the setting of the variable resistor $R_5$ is varied, the firing point of the controlled rectifier $CR_1$ is changed and the interval of current conduction between the high leakage reactance secondary windings and the primary windings of each of the ballast circuits is increased or decreased depending upon the point in the half cycle at which the controlled rectifier $CR_1$ is fired.

A control apparatus 17 as shown in FIGURE 3 was constructed to drive nine ballasts operating nine 40 watt rapid start lamps at various illumination levels. The circuit components identified below are cited to illustrate a specific reduction to practice of the invention:

| | |
|---|---|
| Bucking transformer 19 | Autotransformer rated at 10 volt-amperes, 120 volt, 60 cyle input, with an output of 90 volts across the secondary winding 22'. |
| Controlled rectifier $CR_1$ | 3 ampere, 300 volt, silicon controlled rectifier. |
| Diodes $D_1$, $D_2$, $D_3$, $D_4$ | Silicon rectifiers having a peak inverse voltage rating of 400 volts, and a rating of 1.3 amperes. |
| Zener diode $Z_1$ | 30 volt, 1 watt Zener diode. |
| Unijunction transistor $UJT_1$ | 2N1671A unijunction transistor. |
| Holding current resistor $R_1$ | 5000 ohms, 10 watt. |
| Resistors $R_2$, $R_3$ | 100,000 ohms, ½ watt. |
| Resistor $R_4$ | 47 ohms, ½ watt. |
| Capacitor $C_1$ | .1 microfarad, 50 volts D.C. |
| Variable resistor $R_5$ | 100,000 ohms, ½ watt, carbon composition, Allen Bradley Type J. |
| Resistor $R_{10}$ | 27,000 ohms. |

With full load and a 120 volt normal input, the control apparatus 17 employing the foregoing circuit components required a power input of 287 watts and 3.85 amperes to operate nine fluorescent lamps at a maximum level of illumination. The power loss in the control apparatus was approximately 17 watts. The dimming ratio of the system was found to be greater than 100 to 1. In other words, the minimum light output to which the fluorescent lamps could be dimmed, was at most 1/100 of the maximum light output.

Turning now to the schematic circuit diagram illustrated in FIGURE 3, I have shown therein an embodiment of the invention wherein the holding current arrangement is incorporated in the individual ballasts. A phase control circuit 51 is shown in block form. A suitable phase control circuit that may be used is one having one or more controlled rectifiers to control the interval of current conduction in each half cycle between a switching line 52 and junction 53. In this exemplification of the invention, the switching network and the unijunction firing circuit illustrated in FIGURE 1 was used as the phase control circuit 51.

A ballast 54 is shown enclosed in a dashed rectangle representing a ballast case 49 and includes a ballast transformer 55, a power factor capacitor $C_3$, and a holding current resistor $R_8$. A plurality of leads 56, 57, 58, 59 are brought out externally of the ballast case 49 for connection with a lamp 10. A grounded conductive plate 60, usually the lamp fixture, is positioned in proximity to the lamp 10. A grounded resistor $R_9$ connected in circuit with lead 59 may be used in conjunction with the conductive plate 60 to complete the auxiliary starting aid circuit. As is well known in the art, such an auxiliary starting aid circuit causes a voltage to be initially applied between one of the lamp electrodes and the conductive plate 60 thereby causing ionization to be initiated in the vicinity of the electrode to facilitate the starting of the lamp 10.

The ballast transformer 55 is comprised of a primary winding 61 connected across input terminal leads 62, 63, a high leakage reactance secondary winding 64, a magnetic core 65, a bucking secondary winding 66 closely coupled with the primary winding 61, a pair of cathode heating windings 67, 68, magnetic shunt 69 and a switching terminal lead 70. It will be noted that the ballast transformer 55 is connected in circuit with the supply lines 71, 72 and the switching line 52 of the phase control circuit 51 by means of the input terminal leads 62, 63 and the switching terminal lead 70.

In accordance with the invention the bucking secondary winding 66 is wound and arranged so that the voltage induced in the bucking secondary winding 66 is substantially equal in magnitude to and 180 degrees out of phase with the voltage induced across the high reactance secondary winding 64. The bucking secondary 66, the holding current resistor $R_8$, the high leakage reactance secondary winding 64, output lead 56, lamp 10, and output lead 59 form a lamp operating loop when the phase control circuit 51 is in a nonconducting state. The voltage induced across the bucking secondary winding 66 cancels out the voltage across the high reactance secondary winding 64. Consequently, this arrangement insures that the net voltage applied across the lamp 10 is substantially equal to zero when the phase control circuit 51 is in a nonconducting state.

Although in FIGURE 3 there is shown only one ballast 54 connected with the supply lines 71, 72 and switching line 52, it will be understood that a plurality of such ballasts may be connected in and operated by the phase control circuit 51. The total number of ballast circuits which can be used with a particular phase control circuit will, of course, depend upon the volt-ampere rating of the phase control circuit 51. It will also be understood that the peaking or oscillatory circuit arrangement which I have shown in the ballast apparatus 30 of FIGURE 1 may also be incorporated, if desired, in the ballast apparatus 54 to make it possible to achieve higher dimming ratios.

Referring again to the equivalent circuit diagram shown in FIGURE 2, the phase control circuit 51 shown in FIGURE 3 may be considered equivalent to the switch 50 of FIGURE 2. Further, the serially connected bucking secondary winding 66 and holding current resistor $R_8$ of FIGURE 3 may be considered equivalent to the holding current branch of FIGURE 2, which includes the source supplying the bucking voltage $E_3$ and the holding current resistor $R_1$.

The theory of operation of the circuit shown in FIGURE 3 is substantially the same as was previously discussed in connection with the circuit shown in FIGURE 1. When the phase control switch 50 is in the "open" position, the voltages $E_2$ and $E_3$ cancel each other out and no voltage is supplied to the lamp 10. When the phase control switch 50 is in the "closed" position the supply voltage $E_1$ and the ballast secondary voltage $E_2$ are applied across the lamp 10. During this switching interval in each half-cycle, the bucking voltage source represented by $E_3$ and the holding current resistor $R_1$ insure that sufficient holding current flows through the phase control switch 50.

Turning to the schematic circuit diagram of FIGURE 3, the operation of the apparatus shown therein will now be more fully described. It will be noted that the holding current resistor $R_8$ and the bucking secondary winding 66 form a branch across input terminal lead 63 and switching lead 70 so that when the phase control circuit 51 is in a nonconducting state, an operating loop is formed which includes the bucking secondary winding 66, the holding current resistor $R_8$, the high leakage reactance secondary winding 64, lamp 10 and output lead 59. Further, when the phase control circuit 51 is in a conducting state, the primary winding 61 is connected in circuit with the high leakage reactance secondary winding 64, and the combined voltage across the primary winding 61 and across the high leakage secondary winding 64 is applied across lamp 10 during this switching interval in each half cycle of the alternating power supply. Thus, dimming of the fluorescent lamp 10 and other lamps that may be connected in the system is achieved by controlling this interval and thereby controlling volt-time integral of the lamp voltage. As the firing of the phase control circuit 51 is delayed in the half cycle, the lamp 10 is progressively dimmed. During the interval that the phase control circuit 51 is off, the voltage across the bucking winding 66 cancels out the voltage induced across the secondary winding 64 thereby insuring that no voltage is applied across the lamp 10 that would produce variations in its light output. Further, it will be appreciated that when the phase control circuit 51 is in a nonconducting state the voltage across the bucking winding adds to the primary voltage and in conjunction with the holding current resistor $R_8$ insures that sufficient holding current is provided through the conducting controlled rectifier of the phase control circuit 51 to maintain the phase control circuit 51 in a conducting state until the end of the half cycle.

When the phase control circuit 51 is in a conducting state, the current will traverse a path which includes supply line 72, junction 53, phase control circuit 51, switching line 52, switching terminal lead 70, high leakage reactance secondary 64, output lead 56, lamp 10, output lead 59, terminal lead 63 and supply line 71. Thus, during this interval in each half cycle of the alternating power supply the voltage across the primary winding 61 and the high reactance secondary 64 is applied across lamp 10 to operate the lamp at a predetermined illumination level depending upon the duration of the interval. Similarly, in all of the other ballasts, which may be connected in circuit across the supply lines 71, 72 and the switching line 52, the fluorescent lamps associated with the ballasts will be operated at the same illumination level.

It will be understood that other phase control circuits employing controlled rectifiers or other phase controlled switching devices may be used in conjunction with the holding current arrangement of the present invention. For example, a pair of controlled rectifiers connected in inverse parallel relationship and alternately fired in each half cycle may be used to control the volt-time integral of the lamp voltage. The embodiments which I have described herein are intended as specific examples of the invention. It will be apparent that many modifications may be made of the particular embodiments described herein. It is to be understood, therefore, that I intend by the appended claims to cover all such modifications that fall within the true spirit and scope of the invention.

What I claim as new and desire to secure by Letters Patent of the United States is:

1. A system for operating and dimming fluorescent lamps from an alternating power source comprising a first and a second input lead for connection with the alternating power source; a pair of supply lines connected in circuit with said input leads; a phase control circuit including at least one phase controlled switching device and a firing circuit to supply a firing pulse to the phase controlled switching device at a predetermined point in each half cycle of the alternating power source to switch said phase controlled switching device to a conducting state; a switching line connected in circuit with said phase controlled switching device, said device being connected in circuit with said first input lead and causing said switching line and said first input lead to be connected in electrical circuit when said device is fired to said conducting state; at least one ballast including a ballast transformer, said ballast transformer having a primary winding connected across a pair of input terminal leads connected in circuit with said supply lines, a high reactance secondary winding inductively coupled with said primary winding, output leads for connection in circuit with at least one fluorescent lamp and a switching terminal lead connected in circuit with said high reactance secondary and said switching line; a holding current branch including a bucking voltage source and a holding current resistor connected in series circuit relation therewith, said holding current branch being connected in a closed loop with said lamp and at least said high reactance secondary winding, said voltage of said bucking voltage source cancelling out the voltage across the high reactance secondary winding when the phase controlled switching device is in a nonconducting state, and said holding current branch insuring that sufficient holding current flows through said phase controlled switching device when said device is in a conducting state.

2. A system for dimming and operating gaseous discharge lamps from an alternating current source, said system comprising a plurality of gaseous discharge lamps; a plurality of ballast transformers, each of said ballast transformers having a primary winding with input terminal leads connected in circuit with the alternating current source, a high leakage reactance secondary winding inductively coupled with said primary winding on a magnetic core and a switching terminal lead connected with one end of said high leakage reactance secondary winding; each of the ballast transformers including circuit means connecting at least one of said plurality of lamps in a lamp circuit including at least said high reactance secondary winding, said primary winding, said switching terminal lead and one of the input terminal leads of the ballast transformer; a phase control means connected in circuit between said one of the input terminal leads of said primary winding and said switching terminal lead of each of said ballast transformers, said phase control means including at least one controlled rectifier to control the volt-time integral of the lamp voltage; a bucking voltage source; a holding current resistor; circuit means connecting said bucking voltage source and holding current resistor in series circuit relation and connecting said bucking voltage source and holding current resistor in circuit across said switching terminal leads and the other of said input terminal leads of said plurality of ballast transformers, said bucking voltage source providing a voltage substantially equal in magnitude and opposite in phase to the voltage generated across said secondary windings of said ballast transformers when said controlled rectifier is in a nonconducting state during each half cycle thereby preventing voltage from being applied across said lamp in each half cycle when said phase control means is blocking current to said high leakage reactance secondary winding.

3. A ballast apparatus for operating a fluorescent lamp at various illumination levels from an alternating power source and for use in conjunction with a phase control circuit employing at least one phase controlled switching device to control the volt-time integral of the lamp voltage, said apparatus comprising a pair of input leads for connection across the alternating power source, one of said input leads being adapted for connection in circuit with said phase control circuit; a transformer having a primary winding connected across said input leads, a high leakage reactance secondary winding, a bucking secondary winding and a switching terminal lead for connection with the phase control circuit and connected in circuit with one end of said high leakage reactance secondary winding, said bucking winding being inductively coupled with said primary winding and having one end connected to said one end of the high leakage reactance secondary winding and the other end connected in circuit with one of said input leads, said bucking winding providing a voltage substantially equal in magnitude to the voltage induced in said high leakage reactance secondary winding but opposite in phase, said voltage being effective in each half cycle of the alternating power supply when the phase control circuit is nonconducting to cancel the voltage induced in said high leakage reactance secondary winding.

4. A ballast apparatus for operating a fluorescent lamp at various illumination levels from an alternating current source and for use in conjunction with a phase control circuit employing at least one phase controlled switching device to control the volt-time integral of the voltage applied across the fluorescent lamp, said apparatus comprising a pair of input leads for connection across the alternating current source, one of said input leads being adapted for connection in circuit with the phase control circuit; a transformer having a primary winding, a high leakage reactance secondary winding and a bucking secondary winding, said secondary windings being inductively coupled with said primary winding, a switching terminal lead for connection with the phase control circuit and having one end thereof connected in circuit with one end of said high leakage reactance secondary winding, said primary winding being connected across said input leads, said bucking winding having one end connected to one end of said primary winding and having the other end thereof connected in circuit with said one end of the high leakage reactance secondary winding; a holding current resistor connected in series circuit relation with said bucking winding, said bucking winding providing a voltage substantially equal to and 180 degrees out of phase with the voltage induced in said high leakage reactance secondary winding; and circuit means including output leads for connection to the fluorescent lamp and for supplying the output of the apparatus thereto, said phase control circuit when in a conducting state connecting said switching lead in circuit with said input lead adapted for connection in circuit with the phase control circuit, said bucking winding and said holding resistor causing sufficient holding current to be provided for said phase controlled switching device, and said voltage across said bucking winding cancelling said voltage across said high reactance secondary winding when said phase control circuit is in a nonconducting state.

5. An apparatus for use in conjunction with at least one ballast transformer for operating fluorescent lamps at various illumination levels from an alternating power source, said ballast transformer having at least a primary winding, a high leakage reactance secondary winding, input terminal leads, a switching lead connected in circuit with said high leakage reactance secondary winding, said apparatus being adapted for connection in circuit with said input terminal leads and said switching lead and for controlling the interval of current conduction between one of said input terminal leads and said switching lead, said apparatus comprising a transformer having a primary and a secondary winding inductively coupled therewith, a pair of input leads for connection to the alternating power source, a pair of supply lines for connection in circuit with the alternating power source and with the input terminal leads of the ballast, a phase control circuit including at least one phase controlled switching device and a firing circuit for firing said phase controlled switching device at a predetermined point in each half cycle of the alternating power source, a switching line connected in circuit with said phase control circuit, said switching line being connected in circuit with one of said supply lines when said phase control circuit is in a conducting state, a holding current resistor, circuit means connecting said secondary winding and said holding current resistor in circuit across one of said supply lines and said switching line, said voltage induced across said secondary winding being equal in magnitude to the voltage induced across the high leakage reactance secondary winding of the ballast transformer and cancelling said voltage induced in the high leakage reactance secondary when the phase control circuit is in a nonconducting state.

6. An apparatus for controlling the interval of current conduction in each half cycle of an alternating power source from a switching lead connected in circuit with the secondary winding of at least one ballast transformer to an input terminal lead of the ballast transformer, said apparatus comprising a pair of input leads for connection to the alternating current source, a phase control circuit, said phase control circuit including at least one phase controlled switching device and a firing circuit, said firing circuit providing a firing pulse at a predetermined point in each half cycle of the alternating power source, a pair of supply lines for connection in circuit with the primary winding of the ballast transformer, said supply lines being connected in circuit with said input leads, a switching line for connection to the switching lead of the ballast transformer and being connected in circuit with said controlled rectifier of the phase control circuit, a bucking voltage source, a holding current resistor connected in series relation with said bucking voltage source, circuit means connecting said bucking voltage source and said holding current resistor in circuit across the switching line and one of said supply lines, the other of said supply lines being connected in circuit with said phase control circuit, said voltage source providing a voltage substantially equal in magnitude to the voltage generated in the secondary winding of said ballast transformer and 180 degrees out of phase therewith, said holding current resistor and bucking voltage source insuring that the current through the controlled rectifier is maintained above its holding current value after the firing pulse is removed from the controlled rectifier.

7. A ballast apparatus for dimming and operating a fluorescent lamp from an alternating power source and for use in conjunction with a phase control circuit employing at least one phase controlled switching device to control the volt-time integral of the lamp voltage, said apparatus comprising a pair of input leads for connection across the alternating power source, one of said input leads being adapted for connection in circuit with the phase control circuit; a transformer having a primary winding connected across said input leads, a high leakage reactance secondary winding, a bucking secondary winding and a switching terminal lead for connection with the phase control circuit, said switching terminal lead being connected in circuit with one end of said high leakage reactance secondary winding, said bucking winding being inductively coupled with said primary winding and having one end thereof connected to said one end of the high leakage reactance secondary winding and the other end thereof connected in circuit with one of said input leads, said bucking winding providing a voltage substantially equal in magnitude to the voltage induced in said high leakage reactance secondary winding but opposite in phase, said voltage being effective in each half cycle of the alternating power supply when the phase control circuit is nonconducting to cancel the voltage induced in said high leakage reactance secondary winding; a holding current resistor connected in series circuit relation with said bucking winding; and circuit means including output leads for connecting at least said high leakage reactance secondary winding in circuit with the fluorescent lamp to supply the output of the apparatus thereto.

8. A ballast apparatus for operating at least one electric discharge lamp at various levels of illumination from an alternating power source and for use in conjunction with a phase control circuit employing at least one solid state switching device to control the volt-time integral of the lamp voltage, said apparatus comprising a high reactance transformer having a primary and a secondary, said secondary having a tap, input means for connecting said primary winding in circuit with the power source, a switching lead connected in circuit with said tap, said switching lead being adapted for connection in electrical circuit with the switching device for switching said tap in circuit with one end of said primary, a serially connected resistor and capacitor, said serially connected resistor and capacitor being connected in circuit with one end of said secondary and with the other end of said primary winding, a holding current resistor connected in circuit with said tap and with the other end of said secondary, and circuit means including output leads for connection with the lamp and for applying output of said apparatus to the lamp.

References Cited in the file of this patent

UNITED STATES PATENTS 3,031,598  Bell ------------------ Apr. 24, 1962

OTHER REFERENCES

Gutzwiller et al.: Silicon Controlled Rectifier Manual, General Electric Rectifier Components Department, Auburn, New York.